United States Patent [19]

Teitel

[11] 4,302,217
[45] Nov. 24, 1981

[54] HYDROGEN SUPPLY SYSTEM

[76] Inventor: Robert J. Teitel, P.O. Box 81921, San Diego, Calif. 92138

[21] Appl. No.: 132,103

[22] Filed: Mar. 20, 1980

Related U.S. Application Data

[63] Continuation-in-part of Ser. No. 927,203, Jul. 24, 1978, Pat. No. 4,211,537.

[51] Int. Cl.³ .................... F02M 21/02; F17D 3/01
[52] U.S. Cl. ......................... 48/180 C; 48/180 P; 48/190; 60/39.12; 60/39.46 G; 123/3; 422/109; 422/110; 422/112; 422/164; 422/167
[58] Field of Search .................. 48/190, 191, 180 C, 48/180 P, 180 H; 423/648 R, 646, 248; 165/DIG. 17; 62/48; 206/0.6, 0.7, 524.1; 123/3, DIG. 12; 65/21; 60/39.02, 39.12, 39.46 G; 137/266, 571; 422/164, 167, 109, 110, 112

[56] References Cited

U.S. PATENT DOCUMENTS

| 2,797,201 | 6/1907 | Veatch et al. ........................... 65/21 |
| 3,350,229 | 10/1967 | Gusti ...................................... 62/48 |
| 3,703,976 | 11/1972 | Hughes et al. .................... 220/88 R |
| 3,732,690 | 5/1973 | Meyer .................................. 48/190 |
| 4,026,499 | 5/1977 | Crosby ................................. 206/0.6 |
| 4,225,320 | 9/1980 | Gell ...................................... 48/191 |

FOREIGN PATENT DOCUMENTS

| 2514834 | 6/1975 | Fed. Rep. of Germany ....... 65/21.4 |
| 2527910 | 1/1976 | Fed. Rep. of Germany . |

OTHER PUBLICATIONS

"Metals Find New Role as Hydrogen Reservoirs", News Feature, Chem. Eng., 9/12/1977, pp. 98, 100, 102.
"Fabrication of the Glass Microballoon Laser Target", Souers et al., 9-1974, NTIS, Dept. of Commerce (Lawrence Livermore Laboratory).
"Prototype Hydrogen Automobile", Henriksen et al., 1st World Energy Conference, March, 1976.
"Iron Titanium Hydride as a Source of Hydrogen Fuel . . .", Reilly et al., 26th Annual Power Sources Conf., May, 1974.
"Metal Hydride Storage for Mobile and Stationary Applications", Hoffman et al., Sae Fuels & Lubricants Meeting, 1976, 423-645.
Proceedings of the DOE . . . Contracts Review, "Development Status of Microcavity Hydrogen Storage Systems for Automotive Applications", Teitel, 11-1979.
"Microcavity Hydrogen Storage", Teitel et al., 2nd Miami Int. Conf. on Alt. Energy Sources, 12-1979.
"Microcavity Hydrogen Storage", Teitel et al., Brookhaven National Laboratory (no date).
"The UCLA Hydrogen Con", Bush et al., Advances in Cryogenic Engr. 1973, pp. 23-27.

*Primary Examiner*—Peter F. Kratz
*Attorney, Agent, or Firm*—K. H. Boswell; Edward D. O'Brian

[57] ABSTRACT

A system for supplying hydrogen to an apparatus which utilizes hydrogen contains a metal hydride hydrogen supply component and a microcavity hydrogen storage hydrogen supply component which in tandem supply hydrogen for the apparatus. The metal hydride hydrogen supply component includes a first storage tank filled with a composition which is capable of forming a metal hydride of such a nature that the hydride will release hydrogen when heated but will absorb hydrogen when cooled. This first storage tank is equipped with a heat exchanger for both adding heat to and extracting heat from the composition to regulate the absorption/deabsorption of hydrogen from the composition. The microcavity hydrogen storage hydrogen supply component includes a second tank containing the microcavity hydrogen supply. The microcavity hydrogen storage contains hydrogen held under high pressure within individual microcavities. The hydrogen is released from the microcavities by heating the cavities. This heating is accomplished by including within the tank for the microcavity hydrogen storage a heating element.

29 Claims, 6 Drawing Figures

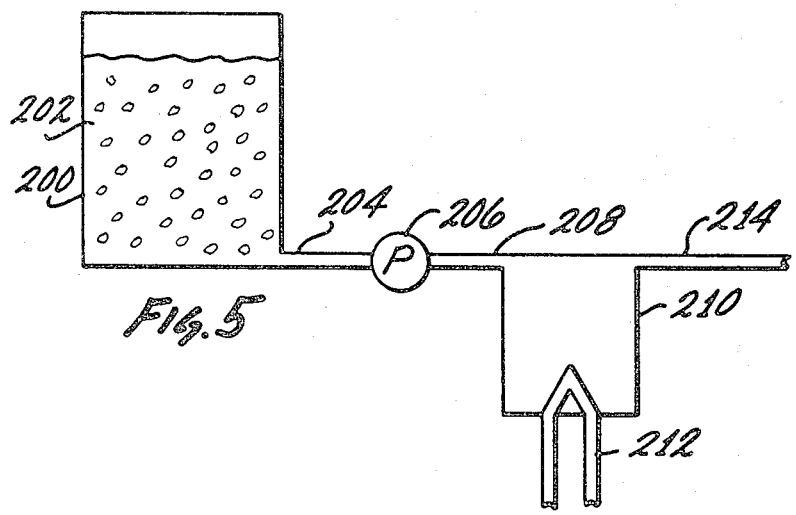
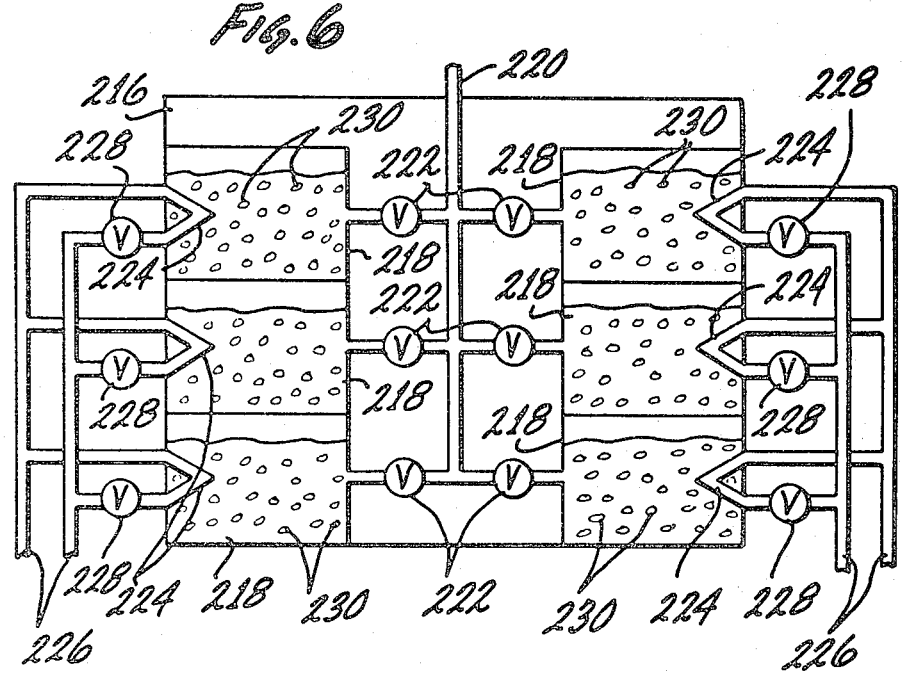

HYDROGEN SUPPLY SYSTEM

CROSS REFERENCE TO RELATED APPLICATIONS

This application is a CIP of my application Ser. No. 927,203, filed July 24, 1978, now U.S. Pat. No. 4,211,537 and entitled HYDROGEN SUPPLY SYSTEM, the entire disclosure of which is herein incorporated by reference.

BACKGROUND OF THE INVENTION

This invention pertains to a system for supplying hydrogen to a hydrogen utilizing apparatus utilizing a combination of a metal hydride hydrogen storage and microcavity hydrogen storage.

Because from an environmental standpoint hydrogen can be cleanly used, because hydrogen has a large capacity for energy transference, and because there is a reversible supply of hydrogen in the form of water, the utilization of hydrogen as a fuel for many different systems is becoming increasingly important. Hydrogen can be used as a fuel in apparatuses which are powdered by combustion engines wherein hydrogen is oxidized and the energy obtained in this oxidation process is used to power the engine with the only product of oxidation being water. Additionally hydrogen can be used as a fuel for electrical energy generation utilizing either the heat of combustion to drive conventional steam turbines or direct use of hydrogen within fuel cells.

At all temperatures except cryogenic temperatures hydrogen exists as a gas. The storage of large supplies of hydrogen as a gas presently is done by compressing the hydrogen and storing in large tanks. An additional conduit supplies hydrogen from the microcavity hydrogen storage hydrogen supply component to the metal hydride hydrogen supply component for recharging the metal hydride hydrogen supply system. However, because the hydrogen is under high pressure it is necessary that these tanks be very strong which in turn necessitates very thick walls and heavy tanks. When hydrogen is stored as a liquid at cryogenic temperatures as with hydrogen as a gas, cryogenic liquid hydrogen must also be contained in strong, heavy tanks and additionally there is an energy penalty in the liquefaction process. Aside from the weight disadvantages of hydrogen storage in tanks both as a liquid and as a gas, the storage tank must be designed and constructed of suitable materials to accomodate and control the permeability and reactivity of hydrogen with most metals.

It has been proposed to store hydrogen chemically bound in a chemical carrier such as methylcyclohexane which is catalytically converted to toluene and hydrogen, the hydrogen being used as fuel and the toluene being recycled back to methylcyclohexane. Use of such a system requires two transportation networks, one for the delivery of the methylcyclohexane to a service station for dispensing to the consumer, the other for the return of the toluene to a reconversion plant to be hydrogenated into methlcyclohexane. This type of system is still in a semihypothetical state and much technology remains to be developed before such systems can hope to be functional.

A system now being field tested for utilizing hydrogen as a fuel to propel an automobile involves the use of a metal hydride as the carrier for the hydrogen fuel. Basically this system involves having a storage tank filled with a metal that reversibly forms a metal hydride. In the presence of hydrogen and the withdrawal of heat, the metal absorbs the hydrogen forming a metal hydride. Upon the application of heat the hydride dissociates into the metal and hydrogen allowing the hydrogen to be utilized as fuel. The heat to disassociate the metal hydride is obtained from the hot exhaust gases from the engine. Currently two metal hydride systems are being studied for use in automobiles. One system is based upon a hydride of an iron titanium alloy and the second system is based upon hydrides of magnesium alloys.

The disadvantage of a total metal hydride system is that the system is both heavy and expensive. The weight problem becomes critical in mobile applications such as automobiles, buses, etc., wherein transportation of the added weight reduces the fuel economy of the vehicle. In stationary systems such as systems utilizing hydrogen in the generation of electricity, weight of the system is not the critical factor, however, in these systems wherein large quantities of metal hydrides will be required the economics of the system become critical.

An additional factor to be considered in mobile systems such as automobile usage of metal hydride systems is the refueling (i.e. regenerating the metal hydride) of the on board metal hydride vehicle storage tank. During refueling the vehicle storage tank would have to be coupled to a unit which withdraw heat from the storage tank allowing for the regeneration of the metal hydride. This would require a complex hookup of hydrogen supply and cooling lines. Compared to the typical five minute stop now necessary to obtain a supply of gasoline, the regeneration of the metal hydride could require a prolonged fuel stop.

BRIEF SUMMARY OF THE INVENTION

In view of the above it is evident that there is a need for new and improved systems which supply hydrogen to an apparatus utilizing hydrogen as a fuel. It is therefore a broad object of this invention to fulfill this need. It is a further object of this invention to provide a hydrogen supply system which is not as expensive as an exclusively metal hydride hydrogen system. Additionally it is an object of this invention to furnish a system which has a hydrogen capacity similar to that of liquid hydrogen yet does not involve the dangerous usage of large quantities of either liquid or gaseous hydrogen. Additional objects include a hydrogen supply system which will deliver hydrogen at greater than atmospheric pressure to the apparatus which will use the hydrogen yet does not require equilibrium storage pressures greater than approximately 50 or 60 atm.

These and other objects are fulfilled by providing a hydrogen supply system which utilizes a metal hydride hydrogen supply component and a microcavity hydrogen storage hydrogen supply component both components supplying hydrogen to an apparatus using hydrogen and additionally the microcavity hydrogen storage hydrogen supply component supplying hydrogen to recharge the metal hydride hydrogen supply component and the system incorporates the metal hydride hydrogen supply component including a storage tank filled with a composition including a metal capable of forming a metal hydride and having a heat exchanger to regulate the temperature of the metal hydride to control absorption/deabsorption of hydrogen from the hydride and the microcavity hydrogen storage hydrogen supply component includes a storage tank containing a microcavity hydrogen storage and a heating element for heating the microcavity hydrogen storage to release hydrogen from the microcavity hydrogen storage and further having regulating valves within the system to regulate the flow of hydrogen from both the metal hydride hydrogen supply component and the microcavity hydrogen storage hydrogen supply component to the hydrogen utilizing apparatus and the flow of hydrogen from the microcavity hydrogen storage hydrogen supply component to the metal hydride hydrogen supply component.

BRIEF DESCRIPTION OF THE DRAWINGS

The invention will be better understood when taken in conjunction with the following drawings in which:

FIG. 5 is a schematic view of an alternate embodiment of the invention; and

FIG. 6 is a schematic view of an alternate embodiment of the invention.

The invention in this specification utilizes certain operative concepts or principles as are set forth and defined in the appended claims forming a part of the specification. Those skilled in the art to which this invention pertains will realize that these concepts or principles can easily be applied to a number of differently appearing and differently described embodiments and for this reason the invention is not to be construed to be limited to the illustrated embodiments but is to be construed in light of the appended claims.

DETAILED DESCRIPTION

Figure 1:
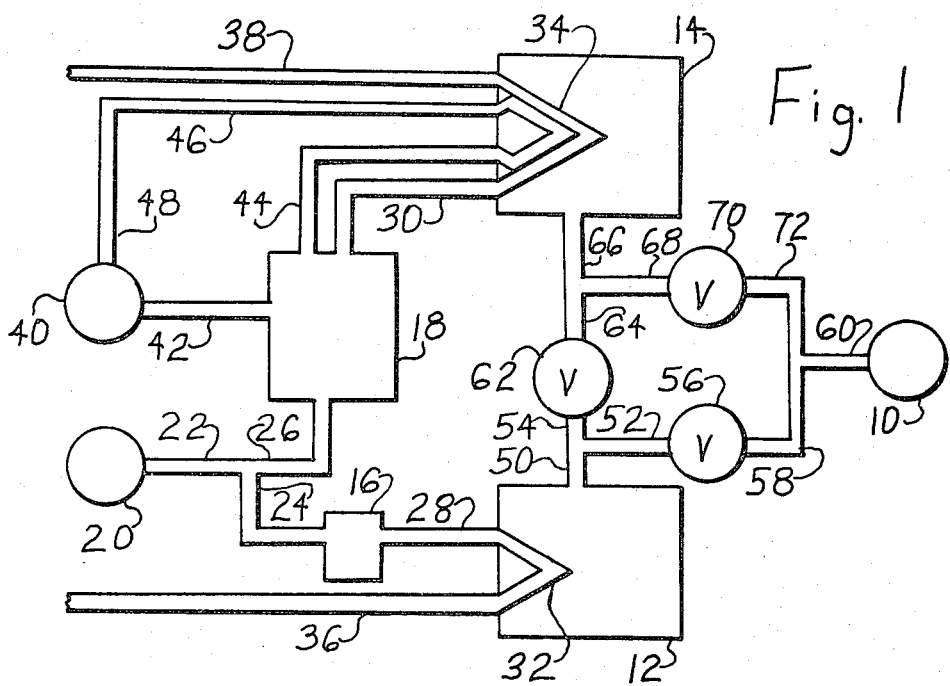
FIG. 1 is a schematic view of the components of the invention.

FIG. 1 shows a generalized embodiment of the invention wherein a hydrogen consuming apparatus 10 is supplied with hydrogen from the hydrogen supply system of the invention. The apparatus 10 could be an energy generating apparatus such as a combustion engine or a fuel cell or it could also be a process plant which utilizes hydrogen as a chemical reactant. Typical process plants include those producing organic chemicals or fertilizers and steel mills which utilize hydrogen as a reducing agent.

In any event hydrogen is supplied to the hydrogen consuming apparatus 10 by a supply system which has a microcavity hydrogen storage hydrogen supply component 12 and a metal hydride hydrogen storage hydrogen supply component 14. The metal hydride component 14 supplies hydrogen for short term hydrogen utilization needs such as peak loading or acceleration. The microcavity component 12 supplies an overall constant demand for hydrogen and is also used to regenerate or refuel the metal hydride component 14.

To release hydrogen from the microcavities of component 12 and the metal hydride of component 14 these respective components are supplied with heat. For energy generating apparatuses such as fuel cells or combustion engines the usual source of this heat is the waste heat given off by either the engine or fuel cell. Alternately an independent heat source could supply the necessary heat.

The control of the rate of discharge of hydrogen from both component 12 and 14, as hereinafter discussed, is governed by the control of the rate of heating of the components 12 and 14. To achieve this the components 12 and 14 are equipped with heat or thermocontrols 16 and 18. Thermocontrol 16 is a monofunctional control which controls the addition of heat to the microcavity component 12 while thermocontrol 18 is a bifunctional control which controls both the addition of heat and the withdrawal of heat from the hydride component 14. Heat energy is supplied to thermocontrols 16 and 18 from a common heat source 20 which in an energy generating apparatus would be waste heat from the apparatus. From heat source 20 heat is supplied to the thermocontrols 16 and 18 via heat supply line 22 having branches 24 and 26 going to components 16 and 18 respectively. From the thermocontrols 16 and 18 heat is conducted by heat supply lines 28 and 30. Line 28 supplies heat to heating element 32 in component 12 and line 30 supplies heat to heat exchanger 34 in component 14.

For an energy utilizing apparatus the heat is generally supplied as a heated fluid. Thus the supply lines, the heating element and the heat exchanger comprise hollow tubes in which this heated fluid flows.

In both energy utilizing apparatuses and other apparatuses the heat energy could be supplied as electrical energy and thus heat source 20 would be a source of electrical energy and heat supply lines 22, 24, 26, 28 and 30 would represent electrical conduits. Heating element 32 and heat exchanger 34 would include resistance elements capable of releasing heat upon the flow of electric current. In the event that heat is supplied via a fluid, heating element 32 and heat exchanger 34 would be connected to exhaust lines 36 and 38 respectively for discharge of the fluid from the heating element 32 and heat exchanger 34. In the event heat is supplied as electrical energy, lines 36 and 38 would represent electrical connection allowing for a complete circuit. The heat exchanger 34 in component 14 is also connected to a coolant supply source 40 via lines 42 and 44. Interspaced between lines 42 and 44 is thermal control 18 which in addition to the control of heat to heat exchanger 34 also controls the flow of coolant to heat exchanger 34. Line 44 is connected to heat exchanger 34 and heat exchanger 34 is also equipped with a coolant exhaust line 46 for discharging exhausted coolant from the heat exchanger 34. Alternately the exhausted coolant could be recycled back to coolant supply 40 via line 48.

Hydrogen gas released from component 12 is supplied to component 14 and apparatus 10 and hydrogen gas released from component 14 is supplied to apparatus 10. Both of these supply systems are accomplished by a series of conduits having flow control valves to control the flow of hydrogen. Conduit 50 supplies hydrogen gas to conduits 52 and 54. Conduit 52 leads to flow control valve 56 and from flow control valve 56 hydrogen gas flows through conduits 58 and 60 to apparatus 10. Additionally hydrogen gas is supplied to component 14 from component 12 via conduit 54, flow control valve 62 and conduits 64 and 66. Hydrogen gas from component 14 is supplied to apparatus 10 via conduits 66, 68, flow control valve 70, conduit 72 and conduit 60.

For the purposes of this specification microcavity is construed as meaning a collection of individual small chambers each capable of holding a volume of hydrogen. These small chambers could exist as independent bodies of one chamber each. Each chamber would be capable of being separated from all other chambers. Alternately they could be a series of individual chambers formed in a single unified body and including in the unified body connecting chambers or spaces or chambers between the individual chambers.

The microcavity storage component 12 consists of a large plurality of microcavities filled with hydrogen gas at pressures up to 10,000 psi. Each individual microcavity generally is from about 5 to about 500 microns in diameter. The walls of the microcavities are generally from about 0.01 to about 0.1 that of the diameter of the microcavities.

Generally for this specification the microcavities would exist as a plurality of microspheres. Each of these microspheres is in of itself an individual hydrogen storage means. Because of this any quantity of individual microspheres can be utilized. These individual microspheres can, however, be sintered together to form a porous structure having both closed hydrogen containing micropores or cavities and interconnecting pores between the cavities which can serve as conduits for transfer of hydrogen both within the sintered body and to the outside surfaces of the sintered body. As an alternate to sintering, a plurality of microspheres could be incorporated within the matrix of a polymer either utilizing the polymer as a glue to hold the individual microspheres together or by forming a polymerized body having microchambers within the body.

In the form of individual microspheres the filled microspheres may be moved from operation to operation like a fine sand or suspended in gas or fluids for transportation. Porous structures, however, offer the advantage of simpler handling. For example, porous cannisters of sintered microspheres could be filled and later inserted in tubes which are equipped with an outlet through which the hydrogen would be released.

Hollow microspheres can be made of plastic, carbon, metal, glasses or ceramics depending upon the performance characteristics desired. Generally the microspheres will be made of silicate glasses such as Emerson-Cuming SI grade high silica containing microspheres.

Under high hydrogen pressures and elevated temperatures hyrogen will diffuse into the microcavities. When stored at normal temperatures and under atmospheric pressure the hydrogen remains inside the microcavity under high pressure. Upon reheating the microcavity the hydrogen is caused to diffuse outside the cavity and is available for utilization by the apparatus 10.

In my copending application, application Ser. No. 927,203, the diffusion into and out of microcavities by hydrogen was described. For the purposes of brevity in this specification the content of the specification of that application is herein incorporated by reference.

The permeability of the microsphere wall can be modified by coating the wall. Typical coatings would include plastics and metals. Metal coatings are of a particular desired utility in that they can be used to reduce the permeability of hydrogen from the microsphere at storage temperatures but not interfere with the diffusion of hydrogen into and out of the microsphere at elevated temperatures during filling of the microspheres or dispensing of the hydrogen from the microspheres. Metal coatings may be applied by electroless and electroplating, chemical vapor decomposition or centrifugal coating techniques. Typical metals suitable for coating silicate glass microspheres include aluminum, molybdenum, nickel, copper and their alloys.

The metal hydride hydrogen storage component 14 utilizes a composition having at least one metal which will form a metal hydride when exposed to hydrogen. Additionally other metals can be alloyed with the primary metal to alter the characteristics of the final metal hydride. The base metal chosen and any additional metals alloyed with it will be governed by the apparatus to which hydrogen is supplied. The criteria governing which metal hydride will be used is the hydride heat of formation. If waste heat from apparatus 10 is used to heat the metal hydride to liberate hydrogen the metal hydride must be capable of liberating hydrogen within the heat range of the waste heat in order to conserve energy and not require expenditure of additional energy for heating the metal hydride.

As noted in the background of the invention currently two hydride systems are being studied for use in a hydrogen fuel automobile. These systems are based upon iron titanium and magnesium alloys. An alloy of equal molar amount of iron and titanium has a heat of formation in kcal. of $-5.5$ per mole of hydrogen. Magnesium hydride has a heated formation of $-17.8$ kcal. per mole of hyrogen. By alloying magnesium with nickel or copper the heated formation can be made smaller. Typically a nickel alloy having a composition $Mg_2Ni$ has a heated formation of $-15.4$ kcal. per mole. Hydrides which have a high decomposition pressure at low temperatures generally have a relatively small value of heat of formation. Magnesium nickel hydride has a dissociation temperature of about 300° C. The dissociation temperature can be reduced by adding zinc to the alloy giving a dissociation temperature of approxmately 260° C. Other metals having usable heats of formation which may be used to form the metal hydride include vanadium, niobium, palladium and an alloy "Misch metal". Also known to form hydrides are potassium, uranium, zirconium, calcium, lithium and cerium; however, they do have a large value of heat of formation.

Iron titanium hydride is heaver than magnesium nickel hydride; however, since iron titanium hydride has a heat of formation of only $-5.5$ kcal. the dissociation temperature of iron titanium hydride is only 25° C. For use in apparatuses 10 which utilize waste heat to liberate the hydrogen from the metal hydride, iron titanium hydride is the preferred metal alloy. Heating this hydride at modest temperatures will cause it to decompose and supply hydrogen at pressures of from about 100 to about 1000 psi.

The efficiency of the metal hydride is also dependent upon the surface area of the metal. The surface area can be greatly improved by cycling the metal through a series of hydride formation hydrogen liberation cycles. Thus the efficiency of the metal hydride as a hydrogen absorber or hydrogen liberator is increased with use. Initially, the hydride is primed by exposing it to several cycles of hydride formation-dissociation.

A useful property of the metal hydrides is that on a volume basis they can contain more hydrogen than cryogenic liquid hydrogen. Microspheres can contain almost as much volume of hydrogen as cryogenic hydrogen; however, as compared to the metal hydrides, the microspheres are able to effect this storage of hydrogen in a smaller unit weight.

Figure 2:
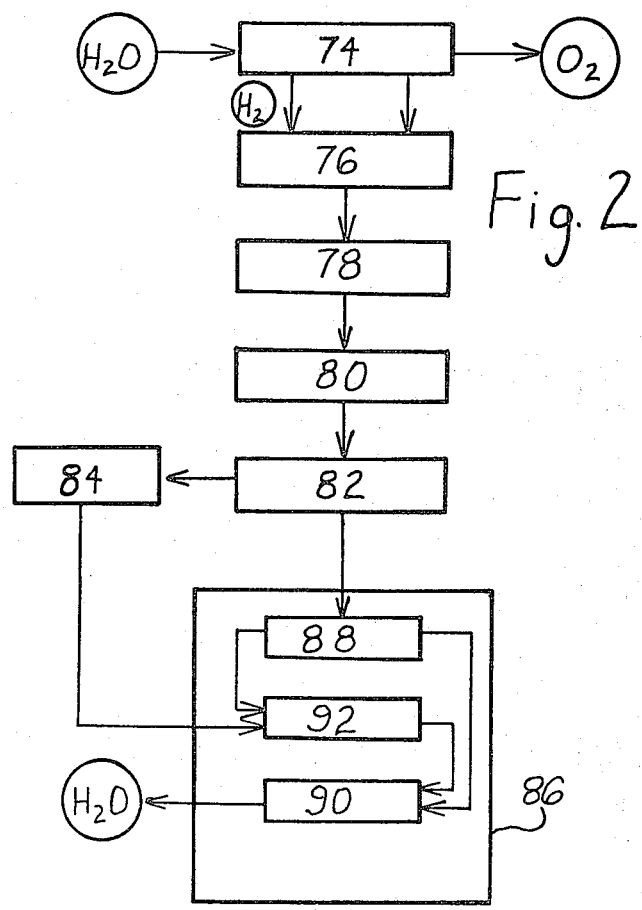
FIG. 2 is a schematic view of the steps between hydrogen production and utilization of hydrogen.

For further illustration of the invention in the remainder of this specification (a) the hydrogen utilization apparatus 10 will be illustrated by a combustion engine used to propel a vehicle most specifically an automobile; (b) the microcavity hydrogen storage component 12 will be microspheres; (c) the metal hydride storage component 14 will be iron titanium hydride. FIG. 2 shows an overall schematic for the utilization of hydrogen from production to power generation.

A hydrogen production plant 74 produces hydrogen by one of several methods. For example, water could be electrolized using conventional power systems, such as solar, fossil fuel or nuclear generation means. Other processes also may be available in the future such as radiochemical or thermochemical processes for hydrogen generation. In any event, water is converted to hydrogen and oxygen and the waste heat from this conversion is used to encapsulate the hydrogen in microspheres in an encapsulation plant 76 which preferably would be located near the production plant. By encapsulating the hydrogen at or near the hydrogen production plant there are several advantages. One, there is a potential economical gain from large scale production; two, waste heat from the production is utilized to encapsulate the hydrogen; and three, transportation of hydrogen is simplified by inclusion of the hydrogen in microspheres and as discussed below this form of transportation achieves a safety advantage.

After encapsulation the hydrogen can be stored in a long term storage facility 78 prior to delivery to a consumer. Since the hydrogen gas is contained in microspheres the pressure in any tanks used to hold the microspheres is much less than the pressure would be in tanks if the hydrogen was stored as either a liquid or a gas. This offers the advantage of reducing to a negligible level embrittlement of the storage tank or storage lines by hydrogen. For long term storage, storage tanks could be cooled to further prevent escape of hydrogen from the microspheres.

After storage the microspheres would be transported by a transporter 80 to regional service station dispensing units 82. The transportation of the microspheres could be effected by transporting tanks of microspheres on trucks, ships, railroad tank cars, etc. or the microspheres could be slurried in a transfer fluid such as nitrogen or air and transported by the fluid within a pipeline. At the receiving end of the pipeline the microspheres would be separated from the fluid using a cyclone separator or the like.

At the service station dispensing units 82 hydrogen from the microspheres could be used in hydride priming operations shown as block 84 and discussed above. However, the primary purpose of the service station dispensing unit 82 would be to dispense the hydrogen containing microspheres to a vehicle 86. On board the vehicle 86 there would be a microsphere storage tank 88 which is filled with the microspheres.

The hydrogen contained in the microsphere storage tank is utilized as a fuel source for the vehicle engine 90 and as a charging source for the metal hydride located in storage tank 92. The vehicle engine 90 burns the hydrogen and uses the power derived from the hydrogen to propel the vehicle. The waste product from this process is water; thus, completing the ecological cycle. It is further conceived that after the microspheres are emptied of their hydrogen they can be recycled to the encapsulating plant for refilling.

Figure 3:
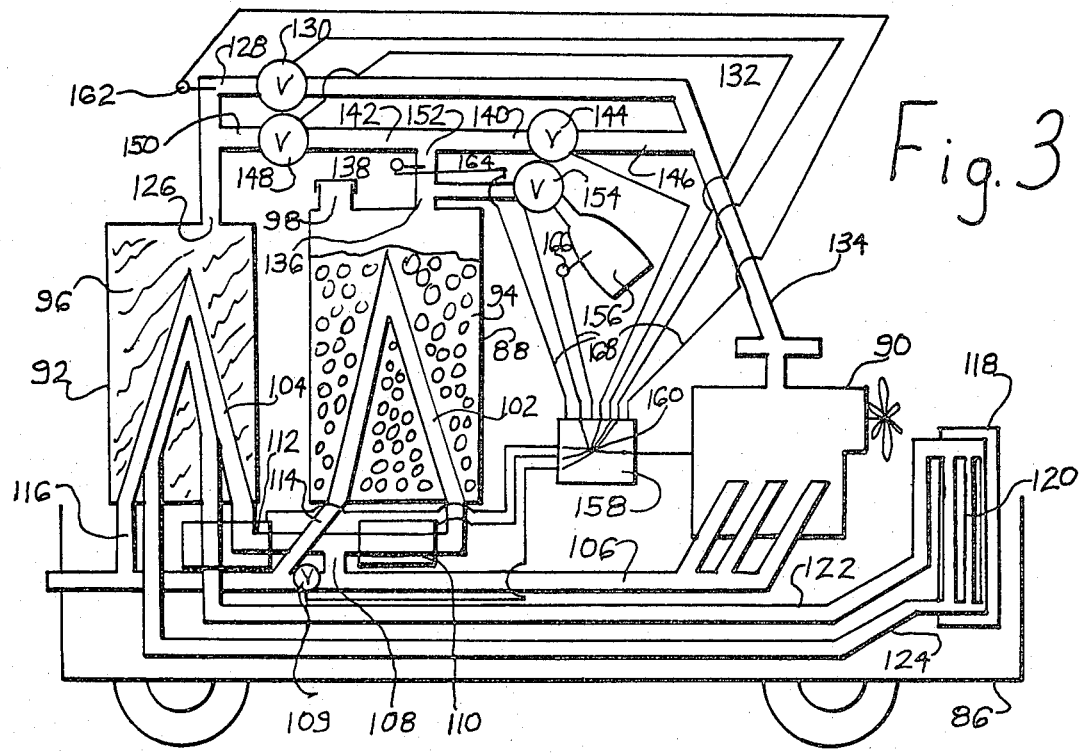
FIG. 3 is a side elevational view in partial section and partial schematic showing a vehicle utilizing the invention.

As shown in FIG. 3 a vehicle 86 having an engine 90 is equipped with a microsphere storage tank 88 and a metal hydride storage tank 92. The storage tank 88 is filled with microspheres 94 and the storage tank 92 is filled with a metal hydride composition 96. Storage tank 88 has an opening 98 equipped with a cap allowing access to the tank for recharging the tank by filling the tank with a fresh supply of microspheres 94.

Within the interior of tank 88 is a heating element 102. Heating element 102 is a hollow tube in which hot gasses pass through. Within the interior of tank 92 is heat exchanger 104 also having a hollow passageway for hot gasses and in addition a second passageway for cooling fluid. An exhaust pipe 106 attaches to the exhaust manifold of engine 90 and conducts hot gasses from the engine. A branch conduit 108 lead from exhaust pipe 106. Down stream from branch conduit 108 is a diverter valve 109 which when closed diverts exhaust gasses in exhaust pipe 106 into branch conduit 108. Branch conduit 108 connects to two thermal controls, thermal control 110 controlling the flow of hot gasses to heating element 102 and thermal control 112 controlling the flow of hot gasses to heat exchanger 104. An exhaust pipe 114 leads from heating element 102 and feeds into exhaust pipe 106 down stream of the diverter valve 109. Likewise an exhaust pipe 116 leads from heat exchanger 104 to exhaust pipe 106.

Vehicle 86 has a radiator 118 for cooling engine 90. Integrated into radiator 118 are heat exchange pipes 120 which connect to coolant supply line 122 and coolant return line 124. Coolant flows through line 122 to thermal control unit 112. From thermal control unit 112 the coolant flows through the heat exchanger 104 in metal hydride tank 92 and then returns to the heat exchange pipes 120 via return line 124.

The metal hydride storage tank 92 has an opening 126 to which is attached hydrogen conduit 128. Conduit 128 connects to hydrogen flow valve 130. On the outlet side of flow valve 130 is hydrogen conduit 132 which connects to engine supply conduit 134. Microsphere storage tank 88 has an opening 136 to which a conduit 138 is attached. Conduit 138 leads into two branch conduits 140 and 142. Branch 140 connects to flow valve 144 and on the outlet side of flow valve 144 is conduit 146 which connects to engine supply conduit 134. Branch conduit 142 connects to flow valve 148 which has an additional conduit 150 attached to its outlet side which further connects to conduit 128.

Also connected to conduit 138 is conduit 152 having a two way flow valve 154. Flow valve 154 is connected to a small hydrogen gas reservoir 156.

A master control 158 is connected to the engine 90, thermal controls 110 and 112, the flow valves 130, 144, 148 and 154, and diverter valve 109 by appropriate control lines all collectively identified by the numeral 160. Pressure sensing units 162, 164 and 166 are located in conduits 128, 138 and gas reservoir 156 respectively. These pressure sensing units are also connected to master control 158 by control lines all collectively identified by the numeral 168.

In use, for engine start up, flow valves 144 and 154 are open upon command by the master control 158 allowing the residual hydrogen gas in tank 88 and the hydrogen gas in reservoir 156 to flow to the engine, there to be utilized as fuel. After several minutes engine 90 reaches its operating temperature and the exhaust gasses expelled by engine 90 become quite hot. Master control 158 signals diverter valve 109 to close and thermal control unit 112 to open allowing the hot exhaust gasses to flow through heat exchanger 104. The heat exchanger heats up the metal hydride within tank 92 causing hydrogen to be released from the metal hydride. Flow valve 130 is open and hydrogen is fed to engine 90 from the metal hydride tank 92. Thermal control 110 is now opened by master control 158 allowing hot gasses to pass through heating element 102 which initiates release of hydrogen from the microspheres 94.

As the flow of hydrogen being released from tank 88 increases, the flow of hydrogen from reservoir 146 is halted and reservoir 156 is repressurized to a predetermined level sensed by pressure senser 166. Valve 154 is then closed trapping a fresh quantity of hydrogen in reservoir 158 which will be used for the next engine start up. Depending on the fuel needs of the engine, master control 158 opens and closes thermal controls 110 and 112 and diverter valve 109 thereby governing the amount of hot gasses passing heating element 102 and heat exchanger 104 which in turn governs the release of hydrogen from tanks 88 and 92.

As the metal hydride in tank 92 becomes depleted of hydrogen a pressure drop in tank 92 is signaled by pressure sensing unit 162 and master control unit 158 signals thermal control 112, stopping the flow of hot gasses through heat exchanger 104 and starting the flow of coolant through the heat exchanger 104. This initiates the removal of heat from tank 92 and flow valve 130 is closed and flow valve 148 is opened allowing hydrogen in tank 88 to pass to tank 92 for regeneration of the metal hydride.

An additional advantage of the invention is that a large portion of the hydrogen used to fuel the vehicle is stored in microcavity hydrogen storage achieving a safety factor. It is known that highly explosive gasses can be stored in microspheres because the spheres effectively quench the spread of flame necessary to maintain an explosion. If a vehicle carrying a large supply of hydrogen encapsulated in microspheres should get in an accident and the microsphere storage tank is ruptured, the hydrogen would not be released but would be safely retained inside the individual microspheres.

Figure 4:
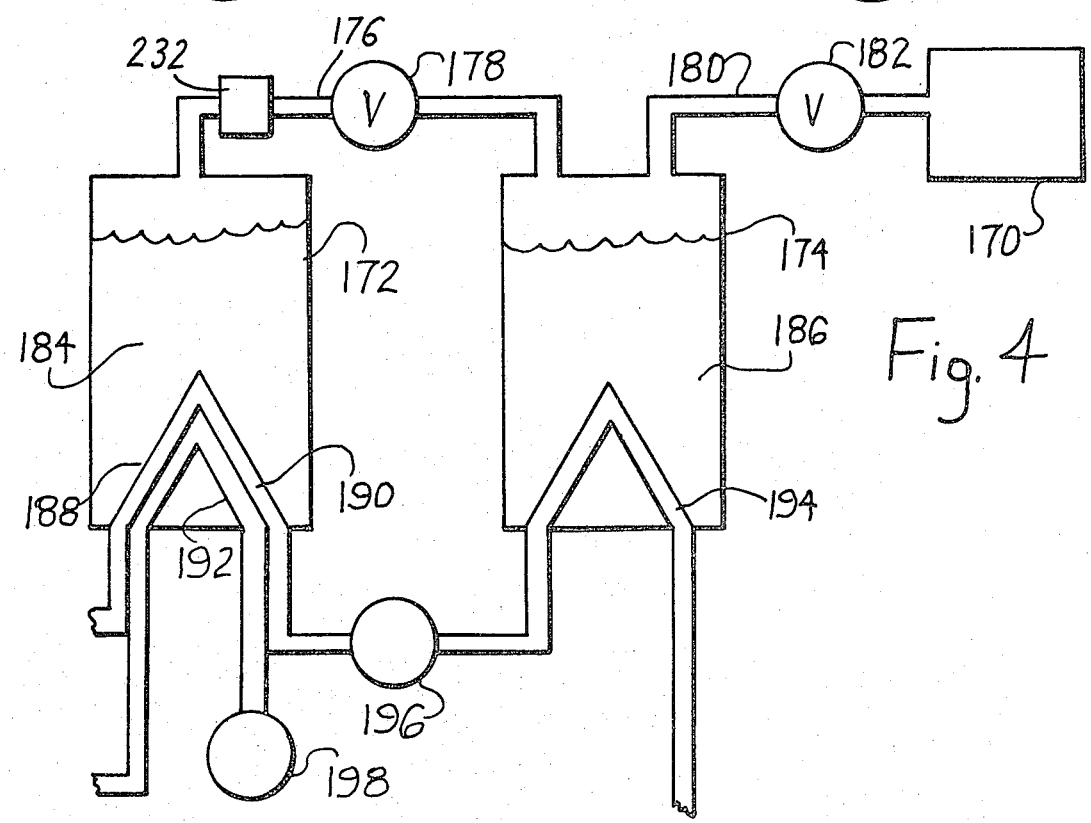
FIG. 4 is a schematic view of an alternate embodiment of the invention.

In an alternate embodiment shown in FIG. 4 hydrogen is delivered to an apparatus 170 utilizing a metal hydride hydrogen storage hydrogen supply component 172 in series with a microcavity hydrogen storage hydrogen supply component 174. The metal hydride component 172 is connected via lines 176 to microcavity hydrogen component 174. Interspaced in line 176 is a control valve 178. A second line 180 connects the microcavity hydrogen component 174 to the hydrogen utilizing apparatus 170. Interspaced in line 180 is a second control valve 182.

The component 172 contains a metal hydride 184 identical to hydrides as previously described. Component 174 contains a hydrogen microcavity storage 186 such as microspheres as previously described. Component 172 includes a heat exchanger 188 containing a heating portion 190 and a cooling portion 192 also identical to similar components as previously described. Component 174 contains a heater 194 as previously described and both heating element 190 and heater 194 are supplied with heat from a heat source 196 similar to that previously described. Cooling component 192 is supplied with coolant from coolant reservoir 198, again as previously described.

Hydrogen can be supplied to apparatus 170 directly from the microcavity storage component 186 by opening valves 182. Alternately hydrogen can be supplied to the apparatus 170 from the metal hydride component 172 by opening both valves 178 and 182. The metal hydride component 184 is recharged from the microspheres 186 by opening valve 178 while valve 182 is closed. The system can also utilize appropriate controls similar to those previously described for monitoring and regulating the flow of hydrogen.

For initial start up of the apparatus 170, when microcavity component 174 is charged with microspheres as the hydrogen supply component 186, the dead spaces in-between the individual spheres can serve as the residual hydrogen storage reservoir. Thus, the microcavity component 174 can contain hydrogen at two different pressures—the first being high pressurized hydrogen inside of the microcavities, the second being low pressured hydrogen outside of the microcavities. This type of hydrogen reservoir can also be used with the other embodiments previously described.

In yet another embodiment of the invention only a single storage tank is used. Located within this storage tank would be both the metal hydride and a microcavity storage system. This embodiment offers the advantage of having the metal hydride in immediate proximity to the microcavity which allows for direct exchange of hydrogen from the microcavities to the metal hydride and additionally, the heat released from the metal hydride as it absorbs hydrogen is used directly to heat up the microspheres to stimulate them to release additional hydrogen.

Typical glass microspheres will release hydrogen at slightly below 175° C. Thus in this system the metal hydride chosen would be one having a somewhat elevated dissociation temperature. Thus the energy released upon absorption of hydrogen would be of a slightly higher temperature than the temperature necessary to free the hydrogen from the microcavity storage. For this type of system metal hydrides based upon magnesium or one of its alloys are preferred.

In another embodiment described in FIG. 5 an additional alternate system for use with the microcavity storage is shown. In this embodiment a main storage tank 200 is utilized to hold a quantity of microspheres 202. Connecting to the main storage tank 200 is a supply line 204. The supply line 204 feeds into a pump or other equivalent structure 206 or transfer means which is capable of moving a quantity of the microspheres 202 from the main storage tank 200 through second supply line 208 to microsphere discharge tank 210.

The discharge tank 210 is equipped with a heater 212 identical in respect to the heaters previously described. The discharge tank 210 is connected via line 214 to a suitable dispensing valve and/or a plurality of lines equivalent to the supply lines in the systems as previously described. This embodiment differs from the previous embodiments, however, in that the discharge tank 210 is of a much smaller volume than the previously described microsphere storage tank. The heater 212 is only required to heat up at any one time only a very small volume of microspheres. Thus less thermal energy is needed to heat up this volume of microspheres and upon shutdown of the system only a small amount of residual hydrogen is located within the interior of discharge tank 210 but exterior of the microspheres within that tank. After shutdown the amount of hydrogen which needs to be taken up by a hydride tank associated with the discharge tank 210 via line 214 is thus lessened. An additional advantage of this embodiment is that since a smaller amount of microspheres are heated by heater 212 a shorter period of time is required to heat them and to release the hydrogen encapsulated therein. Thus the hydrogen from the microspheres is available in a shorter response time.

Since the microspheres 202 are small and spherical and as noted previously they flow like fine sand it is very easy to effect movement of the microspheres from a large main storage tank 200 to a hydrogen discharge tank 210.

Not shown in FIG. 5 is a microsphere removal line leading from discharge tank 210. The discharge tank 210 would include this additional line or conduit connected to it through which the microspheres, once they had been emptied of their hydrogen, would pass on their way to a storage container for the spent microspheres. Also incorporated, of course, could be a pump or other means for effecting movement of the microspheres from the discharge tank 210.

A further embodiment shown in FIG. 6 differs from the one in FIG. 5 in its physical layout, however, incorporates certain of the same advantages as the embodiment in FIG. 5. In this embodiment a main storage tank 216 is compartmentalized into a series of smaller compartments collectively identified by the numeral 218. A main hydrogen discharge line 220 leading from the main storage tank 216 is connected to suitable valves, lines, etc. as per the previously described embodiments to feed hydrogen to the hydride component and/or to the hydrogen utilizing apparatus.

Within the interior of the main storage tank 216, however, the discharge line is connected with a series of valves collectively identified by the numeral 222 which are interspaced between the discharge line 200 and each of the compartments 218. A control means, not shown, would open and close the valves 222 independently to connect one or more of the compartments 218 to the main discharge line 220. A series of heaters collectively identified by the numeral 224 are attached in a parallel relationship to lines collectively identified by the numeral 226 supplying heat as with previous embodiments. Each of the individual heaters 224 is isolated from heat supply lines 226 by a valve, collectively identified by the numeral 228. Each of the individual heaters 224 are located in one of the individual compartments 218. Control of the heater valves 228 is coordinated with control of the valves 222 such that a valve 222 to an individual compartment 218 is open when the valve 228 to the heater 224 in that compartment is also open. In this manner each of the individual compartments 218 are independently capable of releasing hydrogen to the main discharge line 220.

Because the total amount of microspheres 230 located in the main storage tank 216 is compartmentalized it is only necessary to heat up a fraction of this total at one time and thus thermal energy is saved, a large amount of residual hydrogen is not left upon shutdown and release of hydrogen from the individual compartment 218 is effected in a much shorter period of time than if the total body of the microspheres were utilized.

While the compartments 218 shown in the main storage tank 216 of FIG. 6 are depicted as being fixed it would of course be possible to have the individual compartments 218 independent of any main storage tank 216. Thus, individual tanks corresponding to the individual compartments 218 could be used and for refilling and regeneration purposes the individual tanks could be individually exchanged or refilled. Such a system would lend itself to the utilization of a sintered porous structures as previously explained which could be readily and rapidly exchanged when depleted of their hydrogen. Thus, the individual compartments 218 could be formed as canisters which could be opened individually and either a quantity of microspheres or a sintered body readily exchanged for the depleted quantity of microspheres or sintered body previously located within the canister.

For any of the hydrogen storage systems herein described, the metal hydride portions of the system could be augmented by incorporating a compressor in line with the metal hydride storage tank. By utilizing a compressor when the metal hydride is regenerated the speed of absorption of the hydrogen by the metal hydride would increase if the hydrogen pressure in the metal hydride storage tank was increased. Additionally the amount of hydrogen which the metal hydride can take up can also increase with increased pressure. For example, if the pressure of hydrogen over the metal hydride bed was increased to approximately 800 psi the metal hydride could absorb both faster and ultimately absorb more hydrogen.

In the examples shown such as the system depicted in FIG. 1 a compressor could be incorporated in line 66. In the example of FIG. 3 a compressor could be incorporated into line 126, and in the example of FIG. 4 a compressor could be incorporated into line 176 as is, for example, compressor 232 in line 176 between valve 178 and metal hydride component 184. For any system which is mobile a light weight compressor would be utilized. In certain applications a weight savings might be realized by reducing the thickness and therefore the weight of the microcavity storage container and thus the pressure possible to be contained within that container and incorporating a compressor to increase the pressure of the hydrogen between the microcavity storage container and the metal hydride storage container. In stationary applications the weight of the compressor, of course, would not be a factor and in the example shown in FIG. 2, if a compressor were interspaced in the priming operation shown as block 4 and the on board storage tank of the metal hydride shown as block 72 the metal hydride could be recharged at a faster rate and to a greater hydrogen capacity. Alternately for the system shown in FIG. 2 the microspheres used in the priming operation as depicted by block 84 could be extremely high pressure microspheres such as those containing hydrogen up to a pressure of 10,000 psi and this would insure faster exchange and uptake of the hydrogen by the metal hydrides.

I claim:

1. A hydrogen supply system for a hydrogen fueled apparatus which comprises:
   a metal hydride hydrogen supply means including a first storage tank and located within said first storage tank a quantity of a composition containing at least one metal capable of absorbing hydrogen and forming a metal hydride when exposed to hydrogen and said metal hydride capable of being thermally decomposed so as to release hydrogen;
   a microcavity hydrogen storage hydrogen supply means including a second storage tank and microcavity means containing hydrogen encapsulated within said microcavity means located within said second storage tank;
   a first conduit means operatively connected to said metal hydride hydrogen storage means for supplying hydrogen from said metal hydride hydrogen storage means to said apparatus;

a second conduit means operatively connected to said microcavity hydrogen storage hydrogen supply means for supplying hydrogen from said microcavity hydrogen storage hydrogen supply means to said apparatus;

a third conduit means operatively connected between said metal hydride hydrogen storage means and said microcavity hydrogen storage hydrogen supply means for supplying hydrogen from said microcavity hydrogen storage hydrogen supply means to said metal hydride hydrogen storage means;

a first control means operatively associated with said metal hydride hydrogen supply means for regulating the absorption/deabsorption of hydrogen from said metal hydride hydrogen supply means by regulating the temperature of said composition within said metal hydride hydrogen supply means;

a second control means operatively associated with said microcavity hydrogen storage hydrogen supply means for regulating the release of hydrogen from said microcavity hydrogen storage hydrogen supply means;

a first valve means operatively associated with said first conduit means for regulating the flow of hydrogen through said first conduit means;

a second valve means operatively associated with said second conduit means for regulating the flow of hydrogen through said second conduit means; and, a third valve means operatively associated with said third conduit means for regulating the flow of hydrogen through said third conduit means.

2. A hydrogen supply system of claim 1 wherein:
said microcavity means comprises a quantity of microspheres containing hydrogen encapsulated within said microspheres, said microspheres being capable of releasing the hydrogen contained therein upon the application of heat to said microspheres.

3. The hydrogen supply system of claim 2 wherein:
said second control means includes heating means within said second storage tank for heating said microspheres.

4. The hydrogen supply system of claim 1 wherein:
said composition is chosen from the group consisting of iron titanium hydride, magnesium hydride, vanadium hydride, niobium hydride, magnesium nickel hydride, magnesium copper hydride, Misch metal hydride and magnesium nickel zinc hydride.

5. The hydrogen supply system of claim 4 wherein:
said composition is chosen from the group consisting of iron titanium hydride, magnesium hydride, magnesium nickel hydride.

6. The hydrogen supply system of claim 5 wherein:
the metal hydride is iron titanium hydride.

7. The hydrogen supply system of claim 1 wherein:
said first control means includes a heat exchanger within said first storage tank, said heat exchanger absorbing or releasing heat to said composition within said first storage tank.

8. The hydrogen supply system of claim 1 including:
a gaseous hydrogen reservoir, a fourth conduit means operatively associated with said gaseous hydrogen reservoir, said fourth conduit means supplying hydrogen from said reservoir to said apparatus.

9. The hydrogen supply system of claim 1 wherein:
said second storage tank is separated into compartment means, each of said compartment means capable of containing a portion of said microcavity means located in said second storage tank;
said second control means includes a plurality of compartment control means equal in number to said compartment means, each of said compartment control means attaching to one of said compartment means regulating the release of hydrogen from said compartment means.

10. The hydrogen supply system of claim 9 wherein:
said second control means includes a plurality of heating means equal in number to said number of compartment means, each of said plurality of heating means located in association with one of said compartment means for heating said microspheres in said compartment.

11. The hydrogen supply system of claim 1 wherein:
said microcavity hydrogen storage hydrogen supply means includes a hydrogen discharge means located in association with said second storage tank and capable of accepting a portion of said microcavity means from said second storage tank;
said second control means operatively connecting to said hydrogen discharge means regulating the release of hydrogen from said microcavity means located in said hydrogen discharge means.

12. The hydrogen supply system of claim 11 wherein:
said second control means includes a heating means within said hydrogen discharge means for heating said portion of said microcavity means within said hydrogen discharge means releasing hydrogen from said portion of said microcavity means.

13. The hydrogen supply system of claim 1 including:
a compressor means located in association with said third conduit means for compressing said hydrogen supplied from said microcavity hydrogen storage hydrogen supply means before said hydrogen is supplied to said metal hydride hydrogen storage means to a pressure greater than the pressure of said hydrogen released from said microcavity hydrogen storage hydrogen supply means.

14. A hydrogen supply system for a combustion engine equipped with an air-hydrogen mixing means supplying a combustible mixture of hydrogen and air to said combustion engine which comprises:
a metal hydride hydrogen supply means including a first storage tank and located within said first storage tank a quantity of a composition containing at least one metal capable of absorbing hydrogen and said metal hydride capable of being thermally decomposed so as to release hydrogen;

a microcavity hydrogen storage hydrogen supply means including a second storage tank and microcavity means containing hydrogen encapsulated within said microcavity means located within said second storage tank;

a first conduit means operatively connected to said metal hydride hydrogen storage means for supplying hydrogen from said metal hydride hydrogen storage means to said air-hydrogen mixing means;

a second conduit means operatively connected to said microcavity hydrogen storage supply means for supplying hydrogen from said microcavity hydrogen storage hydrogen supply means to said air-hydrogen mixing means;

a third conduit means operatively connected between said metal hydride hydrogen storage means and said microcavity hydrogen storage hydrogen supply means for supplying hydrogen from said microcavity hydrogen storage hydrogen supply means to said metal hydride hydrogen storage means;

a first control means operatively associated with said metal hydride hydrogen supply means for regulating the absorption/deabsorption of hydrogen from said metal hydride hydrogen supply means by regulating the temperature of said composition within said metal hydride hydrogen supply means;

a second control means operatively associated with said microcavity hydrogen storage hydrogen supply means for regulating the release of hydrogen from said microcavity hydrogen storage hydrogen supply means;

a first valve means operatively associated with said first conduit means for regulating the flow of hydrogen through said first conduit means;

a second valve means operatively associated with said second conduit means for regulating the flow of hydrogen through said second conduit means; and, a third valve means operatively associated with said third conduit means for regulating the flow of hydrogen through said third conduit means.

15. The hydrogen supply system of claim 14 wherein: said microcavity means comprises a quantity of microspheres containing hydrogen encapsulated within said microspheres, said microspheres being capable of releasing the hydrogen contained therein upon the application of heat to said microspheres.

16. The hydrogen supply system of claim 15 wherein: said second control means includes heating means within said second storage tank for heating said microspheres.

17. The hydrogen supply system of claim 14 wherein: said combustion engine includes a hot exhaust gas discharge means.

18. The hydrogen supply system of claim 16 wherein: said heating means comprises at least one hollow tube within said second storage tank;
said engine including a hot exhaust gas discharge means;
said hollow tube connecting to said hot exhaust gas discharge means such that hot exhaust gasses from said hot exhaust gas discharge means can pass through said hollow tube heating the contents within said second storage tank.

19. The hydrogen supply system of claim 18 including:
hot exhaust gas flow means for regulating the flow of hot exhaust gasses through said hollow tube.

20. The hydrogen supply system of claim 14 wherein: said composition is chosen from the group consisting of iron titanium hydride, magnesium nickel hydride, and magnesium hydride.

21. The hydrogen supply system of claim 20 wherein: said metal hydride is iron titanium hydride.

22. The hydrogen supply system of claim 14 wherein: said first control means includes a heat exchanger within said first storage tank, said heat exchanger absorbing or releasing heat to said composition within said first storage tank.

23. The hydrogen supply system of claim 22 wherein: said heat exchanger comprises at least one hollow tube within said first storage tank.

24. The hydrogen supply system of claim 23 wherein: said combustion engine includes a hot exhaust gas discharge means, said hot exhaust gas discharge means connecting to said hollow tube such that hot exhaust gasses from said hot gas discharge means can pass through said hollow tube heating said contents in said first storage tank.

25. The hydrogen supply system of claim 24 wherein: said heat exchanger includes at least one coolant conduction tube means;
a coolant supply means;
said coolant supply means supplying coolant to said coolant conducting tube means such that heat from said first storage tank is withdrawn by coolant flowing through said coolant conducting tube means.

26. The hydrogen supply system of claim 24 including:
hot exhaust gas flow means for regulating the flow of hot exhaust gasses through said heat exchanger.

27. A hydrogen supply system for a combustion engine equipped with an air hydrogen mixing means supplying a combustible mixture of hydrogen and air to said combustion engine which comprises:

a metal hydride hydrogen supply means including a first storage tank and located within said first storage tank a quantity of a composition containing at least one metal capable of absorbing hydrogen and forming a metal hydride when exposed to hydrogen and said metal hydride capable of being thermally decomposed so as to release hydrogen;

a microcavity hydrogen storage hydrogen supply means including a second storage tank and microcavity means containing hydrogen encapsulated within said microcavity means located within said second storage tank;

a first conduit means operatively connected to said metal hydride hydrogen storage means for supplying hydrogen from said metal hydride hydrogen storage means to said air-hydrogen mixing means;

a second conduit means operatively connected to said microcavity hydrogen storage hydrogen supply means for supplying hydrogen from said microcavity hydrogen storage hydrogen supply means to said metal hydride hydrogen storage means;

a first control means operatively associated with said metal hydride hydrogen supply means for regulating the absorption/deabsorption of hydrogen from said metal hydride hydrogen supply means by regulating the temperature of said composition within said metal hydride hydrogen supply means;

a second control means operatively associated with said microcavity hydrogen storage hydrogen supply means for regulating the release of hydrogen from said microcavity hydrogen storage hydrogen supply means;

a first valve means operatively associated with said first conduit means for regulating the flow of hydrogen through said first conduit means;

a second valve means operatively associated with said second conduit means for regulating the flow of hydrogen through said second conduit means; and, a third valve means operatively associated with said third conduit means for regulating the flow of hydrogen through said third conduit means;

said microcavity means comprises a quantity of microspheres containing hydrogen encapsulated within said microspheres, said microspheres being capable of releasing the hydrogen contained therein upon the application of heat to said microspheres;

said second control means includes heating means within said second storage tank for heating said microspheres;

said heating means comprises at least one hollow tube within said second storage tank;

said engine including a hot exhaust gas discharge means;

said hollow tube connecting to said hot exhaust gas discharge means such that hot exhaust gasses from said hot exhaust gas discharge means can pass through said hollow tube heating the contents within said second storage tank;

hot exhaust gas flow means for regulating the flow of hot exhaust gasses through said hollow tube;

said metal hydride is iron titanium hydride;

said first control means includes a heat exchanger within said first storage tank, said heat exchanger absorbing or releasing heat to said composition within said first storage tank;

said heat exchanger comprises at least one hollow tube within said first storage tank;

said hot exhaust gas discharge means connecting to said hollow tube such that hot exhaust gasses from said hot gas discharge means can pass through said hollow tube heating said contents in said first storage tank;

said heat exchanger includes at least one coolant conducting tube means;

a coolant supply means;

said coolant supply means supplying coolant to said coolant conducting tube means such that heat from said first storage tank is withdrawn by coolant flowing through said coolant conducting tube means;

a second hot exhaust gas flow means for regulating the flow of hot exhaust gasses through said heat exchanger;

a coolant flow means for regulating flow of coolant through said heat exchanger.

28. A hydrogen supply system for a hydrogen fueled apparatus which comprises:

a metal hydride hydrogen supply means including a first storage tank and located within said first storage tank a quantity of a composition containing at least one metal capable of absorbing hydrogen and forming a metal hydride when exposed to hydrogen and said metal hydride capable of being thermally decomposed so as to release hydrogen;

a microcavity hydrogen storage hydrogen supply means including a second storage tank and microcavity means containing hydrogen encapsulated within said microcavity means located within said second storage tank;

a first conduit means connecting said microcavity hydrogen storage hydrogen supply means to said apparatus;

a second conduit means connecting said microcavity hydrogen storage hydrogen supply means to said metal hydride hydrogen storage means;

a first valve means operatively associated with said first, second conduit means for regulating the flow of hydrogen through said first conduit means;

a second valve means operatively associated with said second conduit means for regulating the flow of hydrogen through said second conduit means;

control means operatively associated with said metal hydride hydrogen supply means and said microcavity hydrogen storage hydrogen supply means for controlling hydrogen release from said metal hydride hydrogen supply means and said microcavity hydrogen storage hydrogen supply means.

29. The apparatus of claim 28 wherein said control means includes:

a first control means operatively associated with said metal hydride hydrogen supply means for regulating the absorption/deabsorption of hydrogen from said metal hydride hydrogen supply means by regulating the temperature of said composition within said hydride hydrogen supply means;

a second control means operatively associated with said microcavity hydrogen storage hydrogen supply means for regulating the release of hydrogen from said microcavity hydrogen storage hydrogen supply means.

* * * * *

UNITED STATES PATENT AND TRADEMARK OFFICE
CERTIFICATE OF CORRECTION

PATENT NO. : 4,302,217
DATED : November 24, 1981
INVENTOR(S) : ROBERT J. TEITEL

It is certified that error appears in the above-identified patent and that said Letters Patent are hereby corrected as shown below:

Column 1, lines 34 through 38, delete the following:

"An additional conduit supplies hydrogen from the microcavity hydrogen storage hydrogen supply component to the metal hydride hydrogen supply component for recharging the metal hydride hydrogen supply system."

Signed and Sealed this

Twenty-seventh Day of July 1982

[SEAL]

Attest:

Attesting Officer

GERALD J. MOSSINGHOFF
Commissioner of Patents and Trademarks